Figure 1:
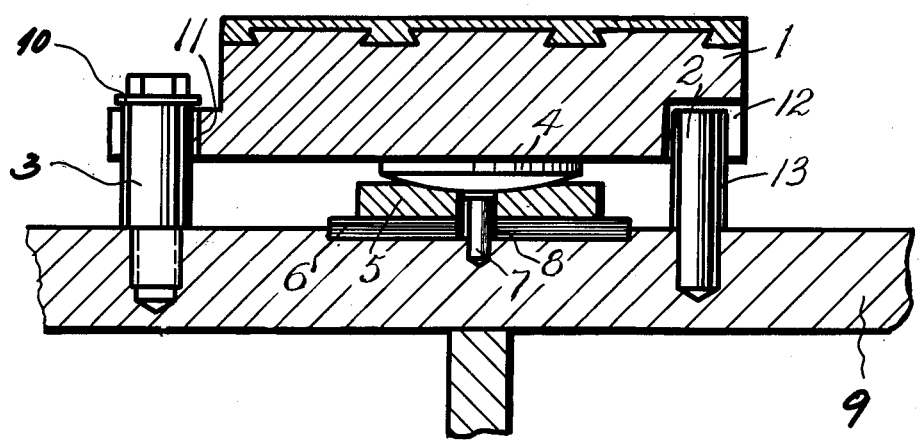

May 8, 1962  W. ERTL ETAL  3,033,619
THRUST BEARING FOR LARGE MACHINES, ESPECIALLY
ELECTRIC MACHINES
Filed Jan. 13, 1958  3 Sheets—Sheet 1

May 8, 1962

W. ERTL ETAL 3,033,619

THRUST BEARING FOR LARGE MACHINES, ESPECIALLY
ELECTRIC MACHINES

Filed Jan. 13, 1958

3 Sheets-Sheet 3

United States Patent Office 3,033,619
Patented May 8, 1962

3,033,619
THRUST BEARING FOR LARGE MACHINES, ESPECIALLY ELECTRIC MACHINES
Walter Ertl and Johann Ptacovsky, Weiz, Austria, assignors to "Elin" Aktiengesellschaft fur Elektrische Industrie, Vienna, Austria, a corporation of Austria
Filed Jan. 13, 1958, Ser. No. 708,680
Claims priority, application Austria Mar. 28, 1957
6 Claims. (Cl. 308—160)

This invention relates to thrust bearings and is particularly concerned with a bearing suitable for large electric generators with vertical shaft and subject to changes of the direction of rotation.

There are already known, for vertical shaft bearings, thrust bearing segments seated above two spring plates which are placed immediately one upon the other and of which one or both are provided with spherically curved seating surfaces. There has also become known a segment construction in which each individual segment is held in place by a supporting bolt.

In another thrust bearing construction the thrust collar is supported by a number of Michell pads having each an individual spherical seating upon a base ring. It is a disadvantage of this construction that said base ring is made of inelastic material and that the mechanical finish has to be very exact in order to obtain an axially symmetrical load on all segments.

It is the chief object of our invention to improve the starting characteristic of the thrust bearing. This has been accomplished by us by designing the thrust bearing in the way hereafter described in detail.

For this purpose the radially disposed segments held by connecting-bolts are supported by spherically faced blocks. Each of these blocks has a spherical seating upon a supporting brass secured to the bottom plate by intermediary members.

The said members are preventing excessive displacements of the spherically faced blocks by securing the spherically faced blocks to the bottom plate in such a way that they are not hindered in their tipping motion and are well movable to all sides.

It is one performance of the present invention to provide bolts, especially of cylindrical section, as holding means for the seating of the spherically faced blocks in the supporting brasses.

A further object of the invention is to apply intermediary members made of an elastic material, such as india rubber. Accordingly, in a preferred embodiment, rubber coverings are provided for the cylindrical holding bolts which serve to secure centrally the spherically faced blocks to the supporting brasses. The rubber has to be oil-resistant. In another preferred embodiment of the invention elastic rings are provided, each of these rings being spaced between the spherically faced block and the supporting brass and acting in the same manner as the above-described centrically holding bolts. These rings may be made of india rubber of an oil-resistant type.

The advantage of all inventive embodiments of the thrust bearing is to avoid a displacement of the spherically faced blocks during mounting. The manner of supporting the segments according to the invention has the effect that the tipping motion of the segments is not hindered but considerably facilitated. This is of particular importance with thrust-bearings for machines subject to changes of the direction of rotation. According to a further inventive embodiment, the supporting brasses of the spherically faced blocks are placed on elastic or insulating plates. Also the bolts holding the segments and the bolts holding centrically the spherically faced blocks in the spherical brasses may have applied elastic or insulating coverings. The bearing segments are seating loosely on the spherically faced blocks and have radial slots for the connecting bolts. The bolts have enough end-play to allow the motion of the segments to all sides. One or both bolts which have to hold one bearing segment, are provided with a collar. These collars have to avoid taking along of the segments when starting under load and during rotation. The accompanying drawing illustrates, by way of example only, particular thrust bearings which embody the invention in preferred form.

Figure 2:
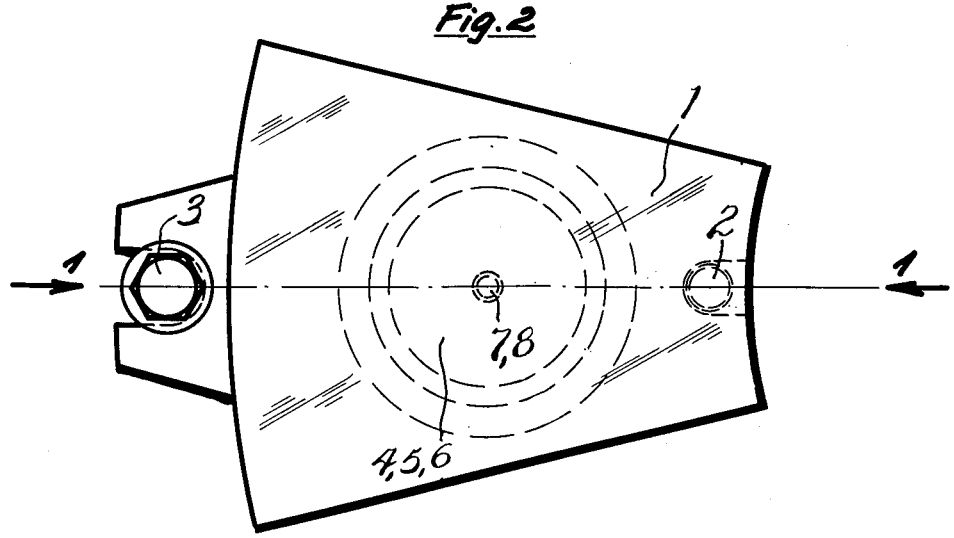
Figure 3:
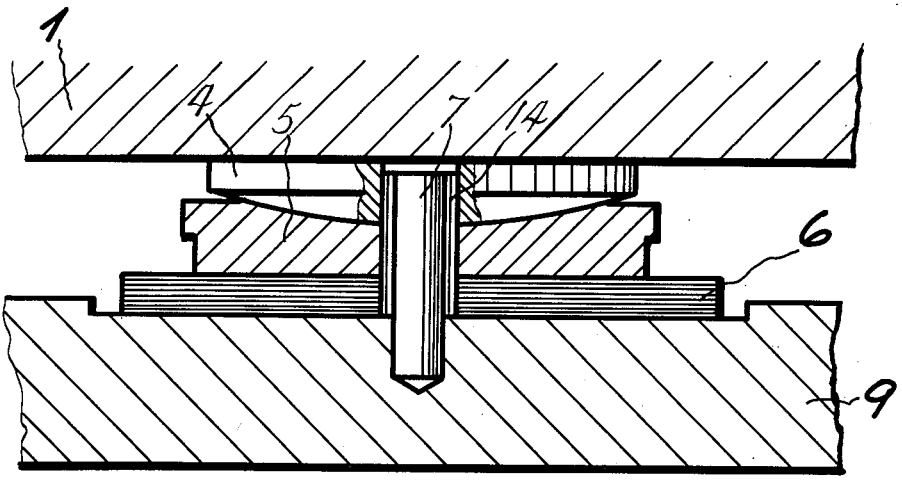
Figure 4:
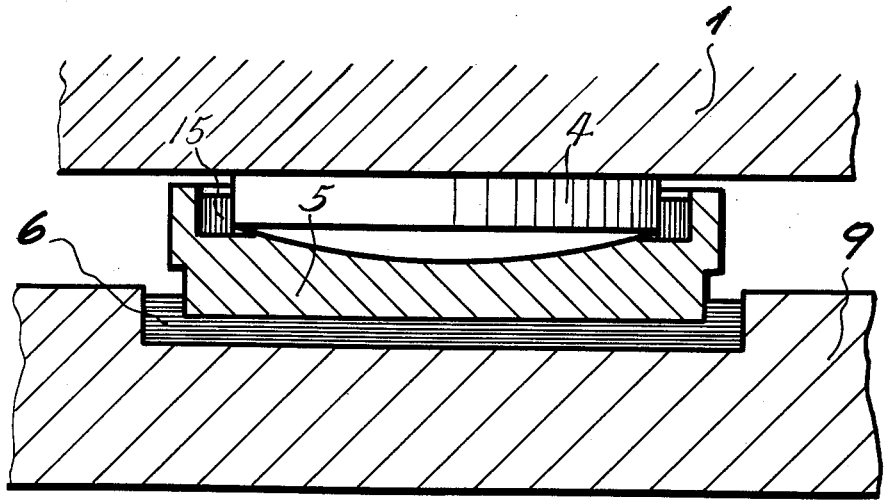
Figure 5:
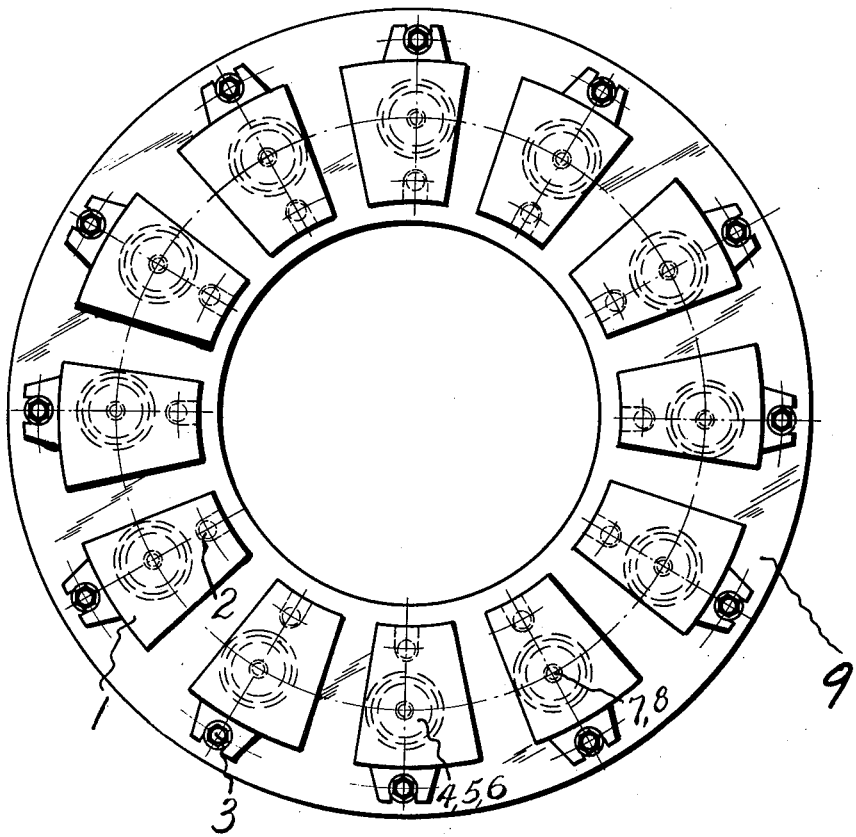

FIG. 1 is a view in section on an axial plane indicated by line 1—1 of FIG. 2. FIG. 2 is a top view of one segment; FIG. 3 and FIG. 4 are views in section corresponding to FIG. 1 but illustrating other embodiments of the invention; and FIGURE 5 is a top plan view of the fixed section of the thrust bearing, in which all bearing segments are shown. According to FIGS. 1 and 2, the bearing segment 1 is seating loosely on the block 4, the underside of which has a spherical surface serving to engage a seat in the supporting brass 5. The brass 5 is seating on an elastic plate 6 which can also be made of insulating material. The connecting-bolts 2 and 3 are spaced with suitable end-play 12 in the slots of the segment 1 so as not to impede the movability of the latter. Because of the spherically shaped seating of the block 4 and of the supporting brass 5, the segment 1 may move very well to all sides, so that there is no impediment to its tipping motion. The elastic plate 6 serves to compensate the inaccuratenesses caused by the manufacture of the single bearing element. In its middle the spherically faced block 4 is located by a bolt 7 which holds centrically said spherically faced block 4 to the supporting brass 5. The supporting brass 5 is carried through the elastic plate 6 and the bolt 7 has enough end-play for radially spacing away the bolt from the supporting brass 5 and from the spherically faced block 4, said bolt has a covering of an insulating or elastic material 8 so as not to impede the tipping motion of the spherically faced block 4 (and of the bearing segment 1) though the bolt 7 is fixed in the bottom plate 9. The circumferential forces acting on the segments 1 are taken up by the bolts 2 and 3. Each of the brasses 5, radially spaced around the axis of the bearing shaft, is seating upon an elastic plate 6 and adheres to it by friction, so that the bolt 7 is not stressed by it. When the direction of rotation is reversed there is a little sliding motion of the spherically faced block 4 relatively to the segment 1, which is compensated by the end-plat of the bolts 2, 3 spaced in the slots of the segment 1. The bolt 3 has on its upper end a collar 10 which serves to detain the relative motion of the segments during the hoisting of the head bearing. The insulation of the bolts 7, 2 and 3 is designated by 8, 11 and 13.

FIG. 3 shows an improved arrangement of the inventive construction of the bearing. The bolt 7 is provided with a covering 14 made of elastic material as for example india rubber.

In FIG. 4 the spherically faced block 4 and the supporting brass 5 are held together by an elastic ring 15. The supporting brass 5 is sunk into the elastic plate 6 which in turn is sunk into the bottom plate 9. The element 15 is made of elastic or insulating material such as for instance india rubber, and have to be oil-resistant. The improved embodiments of the invention make it possible that the segment 1 which has no connection to the spherically faced block 4 may be demounted without demounting the whole head bearing, but only by removing the pressure exerted on the segments.

What we claim as new and desired to secure by Letters Patent of the United States is:

1. A thrust bearing for large machines, especially electric machines, having bearing segments, a bottom plate and means for securing and holding said bearing segments on said bottom plate, said means consisting of holding bolts, said holding bolts in pairs (by twos) securing said bearing segments, each of said holding bolts having a seat in a radial slot in said bearing segment and having enough end-play in said seat, said end-play allowing said bearing segment to make its tilting motion.

2. A thrust bearing for large machines, especially electric machines, having bearing segments, a bottom plate, and means for securing and holding said bearing segments on said bottom plate, each of said bearing segments loosely seating on and supported by a spherically faced block, said block engaging a spherical seating in a supporting brass, said supporting brass being centrically secured in said bottom plate by a cylindrical holding bolt, said bolt centrically locating said spherically faced block in the bottom plate.

3. A thrust bearing for large machines, especially electric machines, having bearing segments, a bottom plate, and means for securing and holding said bearing segments on said bottom plate, each of said bearing segments loosely seating on and supported by a spherically faced block, said block engaging a spherical seating in a supporting brass, said supporting brass being centrically secured in said bottom plate by a cylindrical holding bolt, said bolt having a covering made of an elastic material, such as india rubber.

4. A thrust bearing for large machines, especially electric machines, having bearing segments, a bottom plate, and means for securing and holding said bearing segments on said bottom plate, each of said bearing segments loosely seating on and supported by a spherically faced block, said block engaging a spherical seating in a supporting brass, said supporting brass being centrically secured in said bottom plate by a cylindrical holding bolt, said bolt having a covering, said covering consisting of an oil-resistant material.

5. A thrust bearing for large machines, especially electric machines, having bearing segments, a bottom plate, and means for securing and holding said bearing segment on said bottom plate, each of said bearing segments loosely seating on and supported by a spherically faced block, said block engaging a spherical seating in a supporting brass, said supporting brass being centrically secured in said bottom plate by an intermediary member, said member consisting of an elastic ring spaced in a radial groove in said supporting brass and being blocked between said supporting brass and said spherically faced block, said supporting brass being sunk into an elastic plate, said elastic plate being sunk into said bottom plate.

6. A thrust bearing for large machines, especially electric machines, having bearing segments, a bottom plate, and means for securing and holding said bearing segments on said bottom plate, said means consisting of holding bolts, said holding bolts in pairs (by twos) securing said bearing segments, each of said holding bolts having applied elastic insulating coverings.

References Cited in the file of this patent

UNITED STATES PATENTS

| | | |
|---|---|---|
| 2,557,422 | Fieux | June 19, 1951 |
| 2,744,799 | Howarth | May 8, 1956 |
| 2,779,637 | Schaefer | Jan. 29, 1957 |
| 2,783,101 | Walker | Feb. 26, 1957 |

FOREIGN PATENTS

| | | |
|---|---|---|
| 131,884 | Austria | Mar. 22, 1949 |
| 638,113 | Great Britain | May 31, 1950 |